Figure 1:
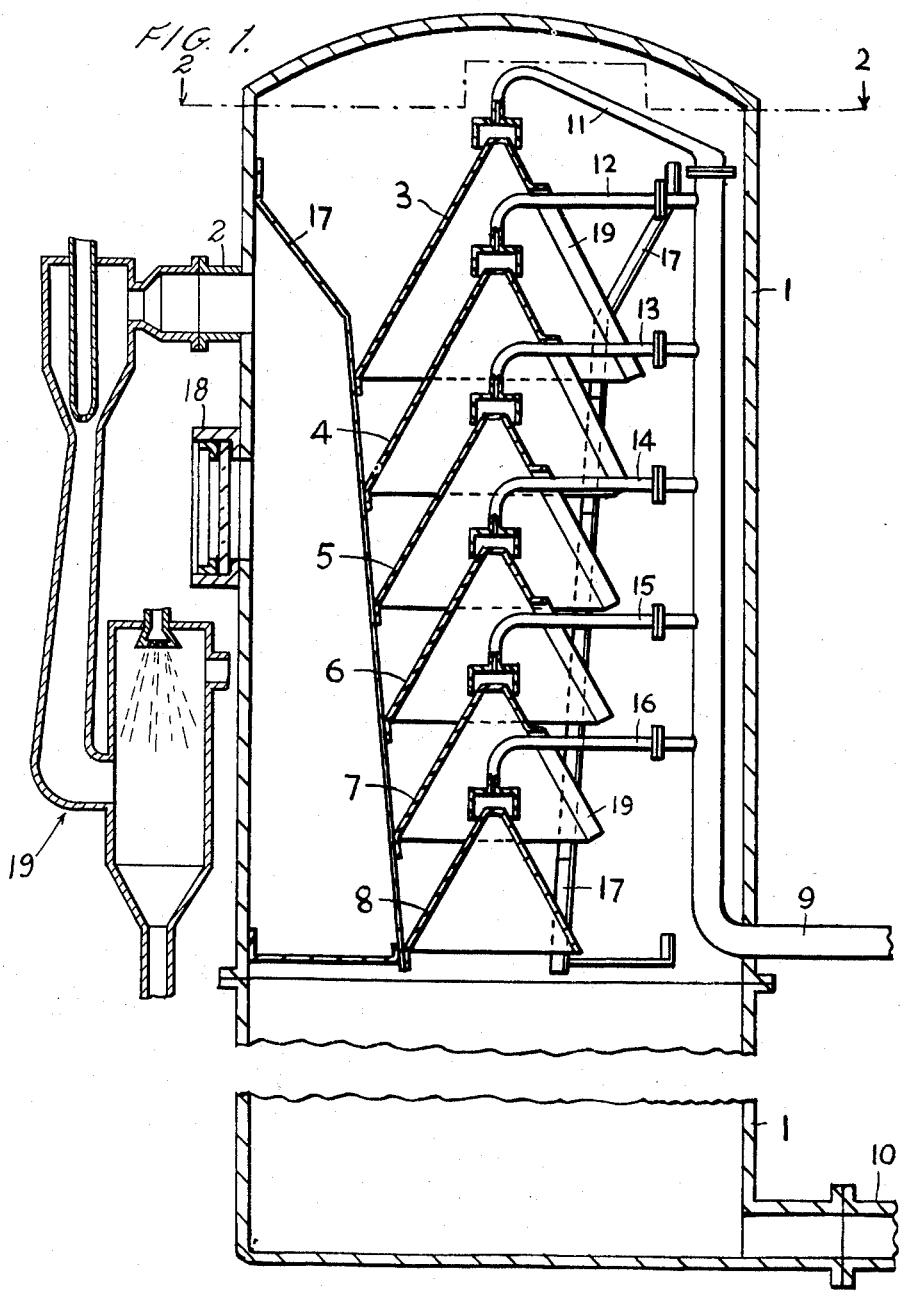

Aug. 9, 1955  J. O. SMITH  2,714,938
APPARATUS FOR THE DE-AERATION OF VISCOUS LIQUIDS
Filed Dec. 9, 1952  2 Sheets-Sheet 1

Inventor
John Oliver Smith
By his attorneys
Howson and Howson

Aug. 9, 1955 J. O. SMITH 2,714,938
APPARATUS FOR THE DE-AERATION OF VISCOUS LIQUIDS
Filed Dec. 9, 1952 2 Sheets-Sheet 2

Inventor
John Oliver Smith
By his attorneys
Howson and Howson

United States Patent Office 2,714,938
Patented Aug. 9, 1955

2,714,938
APPARATUS FOR THE DE-AERATION OF VISCOUS LIQUIDS

John O. Smith, Coventry, England, assignor to Courtaulds Limited, London, England, a British company Application December 9, 1952, Serial No. 324,980

Claims priority, application Great Britain December 18, 1951

3 Claims. (Cl. 183—2.5)

This invention relates to apparatus for the de-aeration of viscous liquids and in particular to apparatus for the continuous de-aeration of solutions of fibre-forming materials, for example viscose.

In the manufacture of fibres from viscose it is necessary to remove air and other gases from the viscose before extrusion since otherwise bubbles of air pass through the extrusion orifice and cause broken filaments or bubbly yarn to be formed. In one method for de-aeration which is commonly used, the viscose is subjected to a high vacuum while holding it in large rest tanks during the ripening. An alternative method has been proposed in which the viscose is allowed to flow on to a cone-shaped plate in a receptacle maintained under vacuum, and air bubbles and gases are removed from the viscose as it runs over the plate and along the walls of the receptacle. Two of the receptacles are employed in this de-aerating system, both vessels are filled with viscose and then the supply of viscose is cut off and one vessel is discharged. While the second vessel is being emptied the first vessel is re-charged with viscose, in this way an uninterrupted flow of viscose ready for spinning is obtained from the system. A continuous method and apparatus for de-aeration have been proposed in which viscose is supplied to a vacuum chamber and is allowed to flow in a layer or film in contact with the side walls of the chamber.

The object of the present invention is to provide improved apparatus for the continuous de-aeration of viscous liquids such as viscose.

According to the present invention apparatus for the continuous de-aeration of viscous liquids such as viscose comprises a container, a vacuum pump connected to the container, a series of conical plates in parallel disposed one below the other, an inlet at the apex of each plate and an outlet at the bottom of the container.

The rim of each conical plate is spaced from the wall of the container and preferably the rim of each succeeding plate is at a greater distance from the wall of the container than the rim of the plate above it, and the apex of each plate coincides with the vertical axis of the container.

Preferably the vacuum in the container is maintained constant during the de-aeration and the vacuum pump used is preferably a steam ejector.

The present invention also includes a process for the continuous de-aeration of viscose which comprises feeding viscose continuously through a vacuum container having a series of conical plates in parallel disposed one below the other wherein the viscose is fed to the apex of each plate, the viscose flows down the surface of each plate in a thin layer and is continuously withdrawn from the bottom of the container. In the process of the present invention a layer of viscose is formed on the surface of each of the conical plates so that a comparatively large quantity of viscose can be de-aerated in a single vacuum container.

Figure 2:
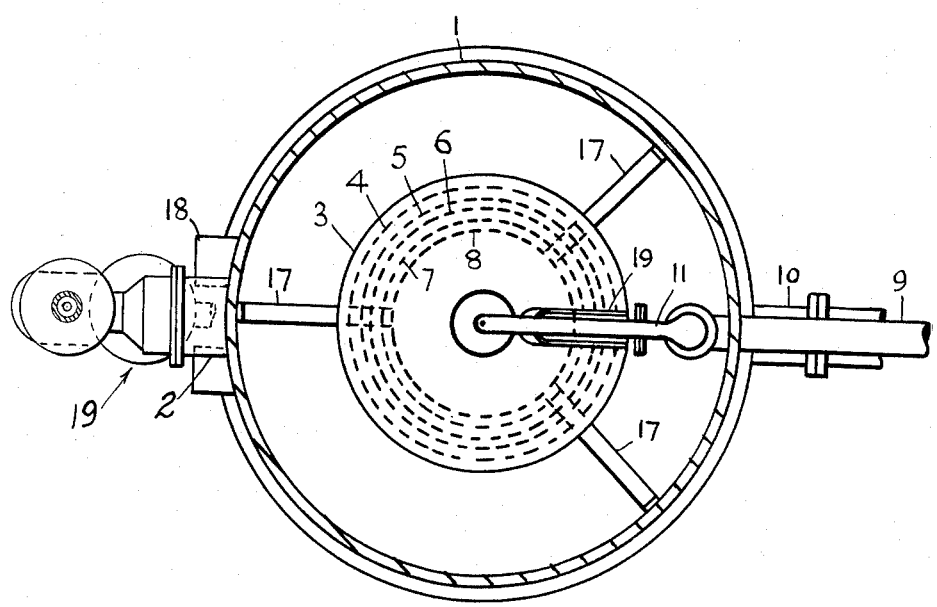
Figure 3:
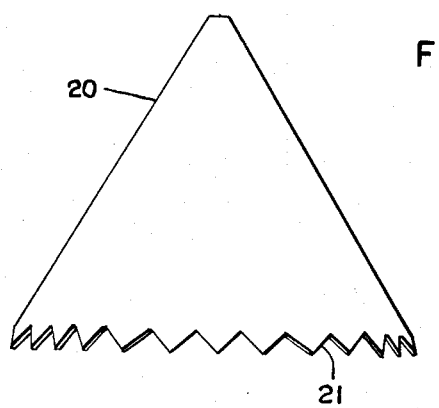

One example of apparatus in accordance with the present invention is shown in the accompanying drawings, in which Figure 1 is an elevation, mainly in section, of a de-aerator having a number of conical plates, Figure 2 is a cross section on the line 2—2 of Figure 1, and Figure 3 is an elevation of a modified conical plate for use in the de-aerator of Figure 1.

The apparatus comprises a container 1 which can be maintained under vacuum by a vacuum pump 19 of a conventional steam ejector type (not shown) coupled to a conduit 2. The lower part of the container 1 is shown broken away. A series of conical plates 3, 4, 5, 6, 7 and 8 are disposed in the upper part of container 1, with the apex of each plate coinciding with the vertical axis of the container 1. The base of each succeeding plate is of smaller diameter, consequently the rim of each plate is at a greater distance from the side wall of the container 1 than the rim of the plate above it. The container 1 has a main inlet 9, and an outlet 10. Individual pipes 11, 12, 13, 14, 15 and 16 are provided from the main inlet 9 to the apex of each of the plates 3, 4, 5, 6, 7 and 8 and are of such dimensions as to give the same rate per foot of flow of the viscous liquid over the periphery of each conical plate. The conical plates 3, 4, 5, 6 and 7 are slotted to provide clearance for the pipes 12, 13, 14, 15 and 16, each slot being surrounded by a flange 19. The plates are mounted in the container 1 by a support 17. The container 1 may have a sight glass 18 in the side wall.

Figure 3 shows an alternative form of conical plate 20 in which the rim 21 is serrated. The serrations 21 split the liquid film leaving the plate 20 into a number of separate streams and thereby facilitate the escape of gases from beneath the cone.

In operation the container 1 is evacuated to a point where the vacuum is sufficiently high to cause boiling of the viscose to be de-aerated. The viscose is fed continuously into the main inlet 9 from which it passes into the pipes 11, 12, 13, 14, 15 and 16 and flows over the surface of the conical plates 3, 4, 5, 6, 7 and 8 as a thin layer or film. On reaching the rim of each of the plates the viscose drops into the lower part of the container 1 and is continuously withdrawn through the outlet 10. The rim of each of the conical plates may be serrated as shown in Figure 3 in order to control the manner in which the film of viscose leaves each plate and to provide additional venting of the space between adjacent plates. The vacuum in the container is maintained constant during the de-aeration.

In one specific example the container 1 may have a total height of 25 feet and a diameter of 6 feet 6 inches. The conical plates are disposed in the upper part of the container 1 and occupy approximately 10 feet. The diameters of the bases of the conical plates are 3 feet 10 inches for plate 3, 3 feet 8 inches for plate 4, 3 feet 6 inches for plate 5, 3 feet 4 inches for plate 6, 3 feet 2 inches for plate 7 and 3 feet for plate 8.

In a further example of a de-aerator having four conical plates, the container may be 13 feet high made up of a curved top, a main cylindrical shell 6 feet 6 inches high and a conical bottom 5 feet 6 inches high. The diameters of the bases of the four cones are 3 feet 4 inches, 3 feet 2 inches, 3 feet and 2 feet 10 inches and they occupy the main cylindrical portion which is 5 feet in diameter. In operation, viscose is de-aerated as it flows over the conical plates and drops into the conical bottom where a constant depth of 4½ feet to 5½ feet of viscose is maintained by a float controlled valve or suitable level controller. Each conical plate receives the same amount of viscose and the total rate of flow through the de-aerator may be 10,000 lbs. per hour or more.

The process of the present invention is illustrated by the following example.

Example

A solution of viscose containing 7.4 per cent of cellulose and 7.0 per cent of caustic soda, having a salt point of 5.5 and a ball fall viscosity of 50 seconds at 15° centigrade was fed from ripening tanks to a de-aerator comprising a cylindrical tank 5 feet 3 inches high and of 22 inches internal diameter containing two cones, the diameters of the bases of the cones were 18 inches and 15 inches respectively. The angle of the cones was 60°. The viscose had not been subjected to de-aeration in the ripening tanks. The rate of feed to the de-aerator was 2,800 lbs. per hour which was divided equally between the two cones giving a viscose film over the surface of each cone.

The temperature on entering the de-aerator was 18° centigrade and an absolute pressure of 16 millimetres of mercury was maintained in the de-aerator so that the viscose flowing over the cones boiled. A two-stage steam ejector was used to maintain this pressure. This ejector operated on steam at 160 lbs. per square inch pressure and handled 23 cubic feet of air and 1100 cubic feet of water per hour at an absolute pressure of 15 millimetres of mercury.

The viscose dropped from each cone to the base of the tank, viscose dropping from the upper cone did not contact the lower cone. A head of viscose approximately 2 feet deep and at a temperature of 17° centigrade was maintained in the bottom of the de-aerator which terminated in a barometric leg approximately 30 feet high. After passing through a line filter the viscose was spun through a series of jets into an acid coagulating bath.

A high rate of flow of viscose is possible with the apparatus of the present invention since each conical plate acts as an independent de-aerating unit. The total rate of flow is proportional to the size and number of plates used, in a large size de-aerator with a number of plates a rate of flow of 10,000 or 20,000 lbs. of viscose per hour is possible and the apparatus is particularly suitable for spinning machines in which large quantities of viscose are decomposed per unit of time for example in high speed spinning machines, viscose spinning machines for producing high tenacity rayon for tyre cord and rayon staple spinning machines. The rate of flow through the de-aerator is independent of the degree of vacuum provided that the vacuum is sufficient to cause boiling of the viscose flowing over the conical plates.

The apparatus is compact in design resulting in economy in factory space, is simple in operation and is easy to maintain. For example only one steam ejector is necessary to de-aerate large quantities of viscose and the surface area with which the viscose is in contact is kept at a minimum so that the tendency of the viscose to gel and to form a skin is much reduced.

What I claim is:

1. Apparatus for the continuous de-aeration of viscose comprising a container, a vacuum pump connected to said container, a series of conical plates, one below the other, in said container, each of said plates having an apex and the apex of each plate being the highest point thereof, and an inlet pipe feeding to the apex of each plate, an end of each pipe and the apex of the associated plate forming an annular orifice through which viscose flows onto the plate as a thin film, and an outlet at the bottom of the container for de-aerated viscose.

2. The apparatus claimed in claim 1 in which the rim of each succeeding plate is spaced further from the wall of the container than the rim of the plate above it.

3. The apparatus claimed in claim 2 in which the rim of each plate is serrated.

References Cited in the file of this patent
UNITED STATES PATENTS

| Number | Name | Date |
|---|---|---|
| 784,748 | Meehan | Mar. 14, 1905 |
| 1,513,354 | Wadsworth | Oct. 28, 1924 |
| 1,556,098 | Gibson | Oct. 6, 1925 |
| 1,620,826 | Mitchell | Mar. 15, 1927 |
| 1,836,338 | Rodman et al. | Dec. 15, 1931 |
| 2,354,674 | Fisher | Aug. 1, 1944 |
| 2,355,057 | Copeland | Aug. 8, 1944 |